US009828535B2

(12) United States Patent
Takenaka et al.

(10) Patent No.: US 9,828,535 B2
(45) Date of Patent: *Nov. 28, 2017

(54) HOT MELT PRESSURE-SENSITIVE ADHESIVE FOR LABELING

(71) Applicant: HENKEL AG & CO. KGAA, Duesseldorf (DE)

(72) Inventors: Makoto Takenaka, Osaka (JP); Tadashi Hayakawa, Osaka (JP)

(73) Assignee: HENKEL AG & CO. KGAA, Duesseldorf (DE)

( * ) Notice: Subject to any disclaimer, the term of this patent is extended or adjusted under 35 U.S.C. 154(b) by 263 days.

This patent is subject to a terminal disclaimer.

(21) Appl. No.: 14/669,630

(22) Filed: Mar. 26, 2015

(65) Prior Publication Data

US 2015/0197676 A1    Jul. 16, 2015

Related U.S. Application Data

(63) Continuation of application No. PCT/JP2013/077008, filed on Sep. 27, 2013.

(30) Foreign Application Priority Data

Sep. 27, 2012 (JP) ................. 2012-215086

(51) Int. Cl.
| | | |
|---|---|---|
| C09J 193/04 | (2006.01) |
| C09J 167/02 | (2006.01) |
| C09J 167/04 | (2006.01) |
| C09J 109/00 | (2006.01) |
| C09J 7/02 | (2006.01) |
| C09J 151/00 | (2006.01) |

(52) U.S. Cl.
CPC ........... *C09J 193/04* (2013.01); *C09J 7/0214* (2013.01); *C09J 109/00* (2013.01); *C09J 151/006* (2013.01); *C09J 167/02* (2013.01); *C09J 167/04* (2013.01); *C09J 2203/334* (2013.01); *Y10T 428/1352* (2015.01); *Y10T 428/2826* (2015.01)

(58) Field of Classification Search
CPC ...... C09J 193/04; C09J 109/00; C09J 167/04; C09J 7/0214; C09J 167/02; C09J 15/006; C09J 2203/334
See application file for complete search history.

(56) References Cited

U.S. PATENT DOCUMENTS

| | | |
|---|---|---|
| 3,993,613 A | 11/1976 | Doss et al. |
| 5,169,889 A | 12/1992 | Kauffman et al. |
| 5,252,646 A | 10/1993 | Iovine et al. |
| 5,312,850 A | 5/1994 | Iovine et al. |
| 5,441,999 A | 8/1995 | Jarvis et al. |
| 5,518,571 A | 5/1996 | Puerkner et al. |
| 9,481,815 B2 * | 11/2016 | Takenaka .............. C09J 167/02 |
| 9,481,816 B2 * | 11/2016 | Takenaka .............. C09J 123/26 |
| 2010/0255228 A1 * | 10/2010 | Dougherty ............. C09J 135/06 428/34.4 |
| 2010/0330315 A1 | 12/2010 | Robert |
| 2012/0288658 A1 | 11/2012 | Noak et al. |
| 2012/0328805 A1 | 12/2012 | Davis |
| 2015/0045488 A1 * | 2/2015 | Takenaka .............. C09J 167/02 524/271 |
| 2015/0045489 A1 * | 2/2015 | Takenaka .............. C09J 123/26 524/271 |

FOREIGN PATENT DOCUMENTS

| | | |
|---|---|---|
| CN | 1197474 A | 10/1998 |
| JP | 4255779 A | 9/1992 |
| JP | 5-339557 A | 12/1993 |
| JP | 6-500350 A | 1/1994 |
| JP | 6-145625 A | 5/1994 |
| JP | 06145625 A | 5/1994 |
| JP | 6-320622 A | 11/1994 |
| JP | 6-320623 A | 11/1994 |
| JP | 8-41435 A | 2/1996 |
| JP | 08041435 A | 2/1996 |
| JP | 10-251612 A | 9/1998 |
| JP | 10279774 A | 10/1998 |
| JP | 11131037 A | 5/1999 |
| JP | 2001-72749 A | 3/2001 |
| JP | 2002-58949 A | 2/2002 |
| JP | 2002-256250 A | 9/2002 |
| JP | 2004-161931 A | 6/2004 |
| JP | 2004-256642 A | 9/2004 |
| JP | 2005-220244 A | 8/2005 |
| JP | 2006-70091 A | 3/2006 |
| JP | 2006070091 A | 3/2006 |
| JP | 2007-51195 A | 3/2007 |
| JP | 2007-262392 A | 10/2007 |
| JP | 2010-90185 A | 4/2010 |
| JP | 2010-155951 A | 7/2010 |
| JP | 2010-280878 A | 12/2010 |
| JP | 2012-1624 A | 1/2012 |
| JP | 2012233119 A | 11/2012 |
| JP | 2013-227459 A | 11/2013 |
| WO | 9410257 A1 | 5/1994 |
| WO | 9510577 A1 | 4/1995 |
| WO | 2009100414 A1 | 8/2009 |
| WO | 2009104372 A1 | 8/2009 |
| WO | 2010115564 A1 | 10/2010 |
| WO | 2011129080 A1 | 10/2011 |
| WO | 2013162058 A1 | 10/2013 |
| WO | 2013162059 A1 | 10/2013 |

OTHER PUBLICATIONS

Pang, X et al. Polylactic acid (PLA): Research, development and industrialization. Biotechnol. J. 2010, vol. 5, 1125-1136.

(Continued)

*Primary Examiner* — Jeffrey Mullis
(74) *Attorney, Agent, or Firm* — Sun Hee Lehmann

(57) ABSTRACT

The present invention provides a hot melt pressure-sensitive adhesive being highly environmentally-friendly, as well having sufficient adhesion, thermal stability and coating performance, and also having an excellent hand-peeling property and alkali-peeling property. The present invention relates to a hot melt pressure-sensitive adhesive for labeling comprising: (A) a polar functional group-modified conjugated diene-based polymer, (B) an aliphatic polyester-based resin, and (C) a tackifier resin.

8 Claims, No Drawings

(56) References Cited

OTHER PUBLICATIONS

Xu, J. et al. Poly(butylene succinate) and its copolymers: Research, development and industrialization. Biotechnol. J. May 2010, 1149-1163.
El-Hadi, Ahmed Mohamed. Development of Novel Biopolymer Blends Based on Poly(L-lactic acid), Poly((R)-3-hydroxybutyrate), and Plasticizer. Polymer Engineering and Science, 2013, Society of Plastic Engineers, Article first published in Jul. 2013. Retrieved from http://onlinelibrary.wiley.com/doi/10.1002/pen.v54.6/issuetoc.
INEOS Oligomers: Indopol Polybutene Specifications and Typical Properties (3 Pages, Undated).
Xuesi Chen, et al. "Polylactic acid (PLA): Research, development and industrialization." Biotechnology Journal, 2010, vol. 5, 1125-1136.

\* cited by examiner

HOT MELT PRESSURE-SENSITIVE ADHESIVE FOR LABELING

FIELD OF THE INVENTION

The present invention relates to a hot melt pressure-sensitive adhesive, and more specifically to a hot melt pressure-sensitive adhesive suitable for labeling for containers (in particular PET bottles) used for soft drinks, seasonings, detergents, shampoos, cooking oils, cosmetics, pharmaceutical products and the like.

BACKGROUND OF THE INVENTION

Widely available containers for drugs or drinks generally include aluminum cans, glass bottles and polyethylene terephthalate (PET) bottles. To the surface of such containers, a label was adhered with a pressure-sensitive adhesive at a strength that does not allow the label to be removed by hand. As Labels for beverage containers, wrap around labels (roll labels) made of polyethylene terephthalate (PET) film, biaxially oriented polypropylene film (OPP) or polylactic acid (PLA) film are often used.

In the recycle of containers with labels, it is necessary to send used containers to a factory and immerse the containers in a heated alkaline aqueous solution to separate the label from the containers. Therefore, pressure-sensitive adhesives applied to labels for containers are required to have a feature of swelling, softening, dispersing or dissolving in an alkaline aqueous solution, so that the label can be removed from the container in a short time (hereinafter, alkali-peeling property).

Japanese Patent Laid-Open Nos. 2005-220244, 2010-90185, 2010-280878, and 2012-1624 disclose hot melt pressure-sensitive adhesives which allow labels to be easily removed from PET bottles. The pressure-sensitive adhesives in the literatures are each an alkali-dispersible hot melt pressure-sensitive adhesive containing a styrene block copolymer and a tackifier resin.

Since the alkali-dispersible hot melt pressure-sensitive adhesives of Japanese Patent Laid-Open Nos. 2005-220244, 2010-90185, 2010-280878, and 2012-1624 contain a large amount of a petroleum-derived tackifier resin, the adhesives are not preferable in the light of environmental balance. Moreover, the alkali-dispersible hot melt pressure-sensitive adhesives of the literatures did not sufficiently meet the rigorous requirement of recent users for the adhesion to PET bottles.

In recent years, in the filed of a hot melt material, because of an increase in awareness of environmental problems, the replacement of conventional petroleum-derived raw materials by natural materials, plant materials and biodegradable materials has developed. In terms of environmental problems, such as global warming due to an increase of carbon dioxide emission, attempts have been made to produce hot melt compositions using non-petroleum-based resins, such as polylactic acid-based resins, containing no petroleum as a raw material.

Japanese Patent Laid-Open Nos. 2010-155951 and 2002-256250 describe hot melt compositions comprising a polylactic acid-based resin. Japanese Patent Laid-Open No. 2010-155951 discloses a hot melt composition comprising polylactic acid-based resin and poly(butylene succinate) or poly(ethylene succinate). Japanese Patent Laid-Open No. 2002-256250 discloses a biodegradable adhesive comprising polylactic acid and a natural powder substance. However, the hot melt compositions do not have sufficient adhesion to a substrate made of polyolefin and the like. Also, the hot melt pressure-sensitive adhesives comprising a polylactic acid-based resin described in the literatures do not provide good coating performance due to the poor compatibility between the polylactic acid-based resin and other components including tackifier resins. Therefore, the adhesives are likely to have lower adhesion and thermal stability than those of a hot melt pressure-sensitive adhesive in which no polylactic acid-based resin is used.

SUMMARY OF INVENTION

An object of the present invention is to solve the above problem and provide a hot melt pressure-sensitive adhesive which is highly environmentally friendly and has sufficient adhesion, thermal stability and coating performance and even maintains good alkali-peeling property. More specifically the present invention provides a hot melt pressure-sensitive adhesive for labeling suitable for being applied to a label adhered to a PET bottle.

The present invention and preferred embodiments of the present invention are as follows.

1. A hot melt pressure-sensitive adhesive for labeling comprising:
    (A) a polar functional group-modified conjugated diene-based polymer,
    (B) an aliphatic polyester-based resin, and
    (C) a tackifier resin.
2. The hot melt pressure-sensitive adhesive for labeling according to the above item 1, wherein the polar functional group-modified conjugated diene-based polymer (A) is a hydrogenated conjugated diene-based polymer having at least one functional group selected from an acid anhydride group, a maleic acid group, a carboxyl group, an amino group, an imino group, an alkoxysilyl group, a silanol group, a silyl ether group, a hydroxyl group and an epoxy group.
3. The hot melt pressure-sensitive adhesive for labeling according to the above item 1 or 2, wherein the polar functional group-modified conjugated diene-based polymer (A) comprises at least one selected from an amino group-modified styrene-ethylene/butylene-styrene block copolymer and a maleic acid group-modified styrene-ethylene/butylene-styrene block copolymer.
4. The hot melt pressure-sensitive adhesive for labeling according to any one of the above items 1 to 3, wherein the aliphatic polyester-based resin (B) comprises at least one selected from a polylactic acid and a poly(butylene succinate).
5. The hot melt pressure-sensitive adhesive for labeling according to any one of the above items 1 to 4, wherein the tackifier resin has an acid value of 100 mg KOH/g to 300 mg KOH/g.
6. A label on which the hot melt pressure-sensitive adhesive for labeling according to any one of the above items 1 to 5 is applied.
7. A container to which the label according to the above item 6 is adhered.

The hot melt pressure-sensitive adhesive of the present invention is environmentally friendly and the components to be blended are significantly highly compatible with each other. In particular, since the hot melt pressure-sensitive adhesive of the present invention contains a polar functional group-modified conjugated diene-based polymer (A), the aliphatic polyester-based resin (B) such as a polylactic acid-based resin has good compatibility with other components. As a result, a hot melt pressure-sensitive adhesive can be obtained, which has high coating performance including easy application to a polyolefin substrate and excellent adhesion. Further, the label adhered to a container such as a PET bottle by using the hot melt pressure-sensitive adhesive of the present invention has not only good adhesion but also good hand-peeling property of being able to be removed by hand without adhesive residue when the label is removed from the container, and even has good alkali-peeling property in an alkaline solution.

DETAILED DESCRIPTION OF THE INVENTION

The hot melt pressure-sensitive adhesive of the present invention comprises at least (A) a polar functional group-modified conjugated diene-based polymer, (B) an aliphatic polyester-based resin and (C) a tackifier resin. Hereinafter, these may be described below as a "A component," a "B component" and a "C component", respectively. A "modified polymer" means to include both (i) one in which a functional group is provided after a polymer is obtained and (ii) one in which a functional group is introduced in the process of polymerization.

Furthermore, the hot melt pressure-sensitive adhesive of the present invention may comprise, in addition to A component, B component and C component, (D) a plasticizer, (E) a wax, (F) a thermoplastic block copolymer, additives such as an antioxidants and the like as required. Regarding each component will be described below.

<(A) Polar Functional Group-Modified Conjugated Diene-Based Polymer>

In the hot melt pressure-sensitive adhesive of the present invention, the use of the polar functional group-modified conjugated diene-based polymer (A) (A component) increases the compatibility between the aliphatic polyester-based resin (B) and other components, such as the tackifier resin (C), and improves the pressure-sensitive adhesiveness, adhesion, and thermal stability, furthermore, improves alkali-peeling property.

Examples of the "polar functional group" of the "polar functional group-modified conjugated diene-based polymer" include acid anhydride groups, such as a maleic anhydride group, a carboxyl group, a maleic acid group, an amino group, an imino group, an alkoxysilyl group, a silanol group, a silyl ether group, a hydroxyl group and an epoxy group. Among these, a maleic acid group and an amino group are preferred.

A "conjugated diene-based polymer" of the "polar functional group-modified conjugated diene-based polymer" refers to a polymer having a structural unit based on a conjugated diene compound (conjugated diene unit).

Here, the "conjugated diene compound" means a diolefin compound having at least a pair of conjugated double bonds. Specific examples of the "conjugated diene compound" include 1,3-butadiene, 2-methyl-1,3-butadiene (or isoprene), 2,3-dimethyl-1,3-butadiene, 1,3-pentadiene and 1,3-hexadiene. 1,3-Butadiene and 2-methyl-1,3-butadiene are particularly preferred. These conjugated diene compounds may be used alone or in combination.

In the present invention, the conjugated diene-based polymer may have, in addition to the conjugated diene unit, structural units based on other monomers. Examples of other monomers include vinyl-based aromatic hydrocarbons, vinyl nitrile and unsaturated carboxylate esters.

In the present invention, as the "conjugated diene-based polymer", for example, a copolymer in which a vinyl-based aromatic hydrocarbon and a conjugated diene compound are block-copolymerized, that is, one having a vinyl-based aromatic hydrocarbon block and a conjugated diene compound block, is preferred.

The "vinyl-based aromatic hydrocarbon" means an aromatic hydrocarbon compound having a vinyl group. Specific examples thereof include styrene, o-methylstyrene, p-methylstyrene, p-tert-butylstyrene, 1,3-dimethylstyrene, α-methylstyrene, vinylnaphthalene and vinylanthracene. Particularly, styrene is preferred. These vinyl-based aromatic hydrocarbons may be used alone or in combination.

Furthermore, in the present invention, the conjugated diene-based polymer constituting the polar functional group-modified conjugated diene-based polymer contained as the A component may be a non-hydrogenated conjugated diene-based polymer or a hydrogenated conjugated diene-based polymer, and a hydrogenated conjugated diene-based polymer is more preferred.

Examples of the "hydrogenated conjugated diene-based polymer" include a block copolymer in which all or a part of the blocks based on the conjugated compound are hydrogenated, such as a hydrogenated styrene-isoprene-styrene block copolymer (that is, also referred to as the styrene-ethylene/propylene-styrene block copolymer "SEPS") and a hydrogenated styrene-butadiene-styrene block copolymer (that is, also referred to as the styrene-ethylene/butylene-styrene block copolymer "SEBS").

Examples of the "non-hydrogenated conjugated diene-based polymer" include a block copolymer in which the blocks based on the conjugated compound are not hydrogenated, such as a styrene-isoprene-styrene block copolymer (also referred to as "SIS") and a styrene-butadiene-styrene block copolymer (also referred to as "SBS"). Among these, SEBS is preferred, and SEBS having a styrene content of 10 to 40% by weight is more preferred for the conjugated diene-based polymer constituting the polar functional group-modified conjugated diene-based polymer contained as the A component.

As a method for producing the polar functional group-modified conjugated diene-based polymer, the polar functional group-modified conjugated diene-based polymer may be produced by synthesizing a conjugated diene-based polymer first, and introducing a polar functional group later, or by performing a copolymerization reaction using a monomer containing a polar functional group.

As the "polar functional group-modified conjugated diene-based polymer", amino group-modified SEBS and maleic acid group-modified SEBS are preferable. In a polar functional group-modified conjugated diene-based copolymer, the position at which a polar group, such as an amino group or a maleic acid group, is introduced is not particularly limited. For example, the polar group is preferably introduced into at least one end of the conjugated diene-based copolymer.

In the present invention, the A component preferably comprises a polar functional group-modified conjugated diene-based polymer having a weight average molecular weight (Mw) of $7.5 \times 10^4$ to $1.0 \times 10^5$.

The weight average molecular weight is measured by gel permeation chromatography (GPC) using a calibration curve using monodisperse molecular weight polystyrene as a standard substance to convert molecular weight.

As the polar functional group-modified conjugated diene-based copolymer, commercial products may be used. Examples thereof include Tuftec MP10 (trade name) manufactured by Asahi Kasei Chemicals Corporation, DYNARON 8630P (trade name) manufactured by JSR and Tuftec M1913 (trade name) manufactured by Asahi Kasei Chemicals Corporation.

<(B) Aliphatic Polyester-Based Resin>

In the hot melt pressure-sensitive adhesive of the present invention, the use of the aliphatic polyester-based resin (B) (B component) is effective to reduce the content of a material made from petroleum and the like (for example, A component or C component), and therefore the environmental load can be reduced.

As the aliphatic polyester-based resin (B), known resins can be used. Examples thereof include polylactic acid-based resins, poly(butylene succinate), poly(butylene succinate-adipate), poly(butylene succinate-terephthalate), poly(ethylene succinate), poly(butylene succinate-carbonate), polyglycolic acid, polycaprolactone, polyhydroxybutyric acid, polyhydroxyvaleric acid and a hydroxybutyric acid-hydroxyvaleric acid copolymer. Among these, polylactic acid-based resins, poly(butylene succinate) and polyhydroxybutyric acid are preferred. These may be used alone or in combinations of two or more.

The above polylactic acid-based resin is a polymer comprising L-lactic acid and/or D-lactic acid as main constituents, and may comprise other copolymerization components other than lactic acid. Examples of such other copolymerization component units include polyvalent carboxylic acids, polyhydric alcohols, hydroxycarboxylic acids and lactones. Specific examples are units produced from polyvalent carboxylic acids, such as oxalic acid, malonic acid, succinic acid, glutaric acid, adipic acid, azelaic acid, sebacic acid, dodecanedionic acid, fumaric acid, cyclohexanedicarboxylic acid, terephthalic acid, isophthalic acid, phthalic acid, 2,6-naphthalenedicarboxylic acid, anthracenedicarboxylic acid, 5-sodium sulfoisophthalic acid and 5-tetrabutylphosphonium sulfoisophthalic acid; polyhydric alcohols, such as ethylene glycol, propylene glycol, butanediol, heptanediol, hexanediol, octanediol, nonanediol, decanediol, 1,4-cyclohexanedimethanol, neopentyl glycol, glycerin, pentaerythritol, aromatic polyhydric alcohols obtained by the addition reaction of bisphenol A or bisphenol with ethylene oxide, diethylene glycol, triethylene glycol, polyethylene glycol, polypropylene glycol and polytetramethylene glycol; hydroxycarboxylic acids, such as glycolic acid, 3-hydroxybutyric acid, 4-hydroxybutyric acid, 4-hydroxyvaleric acid, 6-hydroxycaproic acid and hydroxybenzoic acid; and lactones, such as glycolide, ε-caprolactone glycolide, ε-caprolactone, β-propiolactone, δ-butyrolactone, β- or γ-butyrolactone, pivalolactone and δ-valerolactone, and the like. The content of such other copolymerization units other than lactic acid is generally from 0 to 30 mol % and preferably 0 to 10 mol %, based on 100 mol % of total monomer units.

As the aliphatic polyester-based resin, commercial products may be used. Examples thereof include 4060D" (trade name) and 4032 (trade name) manufactured by NatureWorks LLC, AD92W" (trade name) manufactured by Mitsubishi Chemical Corporation and PHB (trade name) manufactured by Aldrich.

<(C) Tackifier Resin>

In the hot melt pressure-sensitive adhesive of the present invention, the use of the tackifier resin (C) (C component) improves the pressure-sensitive adhesiveness. The "tackifier resin" is not particularly limited as long as it is generally used in hot melt pressure-sensitive adhesives and provides the hot melt pressure-sensitive adhesive targeted by the present invention.

Examples of the tackifier resin can include natural rosins, modified rosins, hydrogenated rosins, glycerol esters of natural rosins, glycerol esters of modified rosins, pentaerythritol esters of natural rosins, pentaerythritol esters of modified rosins, pentaerythritol esters of hydrogenated rosins, copolymers of natural terpenes, three-dimensional polymers of natural terpenes, hydrogenated derivatives of copolymers of hydrogenated terpenes, polyterpene resins, hydrogenated derivatives of phenol-based modified terpene resins, aliphatic petroleum hydrocarbon resins, hydrogenated derivatives of aliphatic petroleum hydrocarbon resins, aromatic petroleum hydrocarbon resins, hydrogenated derivatives of aromatic petroleum hydrocarbon resins, cyclic aliphatic petroleum hydrocarbon resins and hydrogenated derivatives of cyclic aliphatic petroleum hydrocarbon resins. Among these, tackifier resins having an acid value of 0 to 300 mg KOH/g are preferred, tackifier resins having an acid value of 100 to 300 mg KOH/g are more preferred and tackifier resins having an acid value of 150 to 250 mg KOH/g are further preferred. When the acid value is in these ranges, the alkali-peeling property of the hot melt pressure-sensitive adhesive of the present invention is improved.

These tackifier resins may be used alone or in combination. For the tackifier resin, liquid type tackifier resins can also be used as long as they are colorless to pale yellow in color tone, have substantially no odor, and have good thermal stability. Considering these properties comprehensively, hydrogenated derivatives of resins and the like are preferred as the tackifier resin.

As the tackifier resin, commercial products may be used. Examples of such commercial products include MARUKA-CLEAR H (trade name) manufactured by Maruzen Petrochemical Co., Ltd., Clearon K100 (trade name) manufactured by YASUHARA CHEMICAL Co., Ltd., ARKON M100 (trade name) manufactured by Arakawa Chemical Industries, Ltd., I-MARV S100 (trade name) manufactured by Idemitsu Kosan Co., Ltd., Clearon K4090 (trade name) and Clearon K4100 (trade name) manufactured by YASUHARA CHEMICAL Co., Ltd., ECR5380 (trade name), ECR179EX (trade name), ECR5400 (trade name) and ECR5600 (trade name) manufactured by Exxon Mobil Corporation, Regalite R7100 (trade name) manufactured by Eastman Chemical Company, ECR179X (trade name) manufactured by Exxon, ARKON P100 (trade name) manufactured by Arakawa Chemical Industries, Ltd., I-marv S110 (trade name) and I-marv Y135 (trade name) manufactured by Idemitsu Kosan Co., Ltd., Easttack C100-R (trade name) manufactured by Eastman Chemical Company and KR-85 (trade name) manufactured by Arakawa Chemical Industries, Ltd., KE-604 (trade name), KR-614 (trade name) and TAMANOL 901 (trade name) manufactured by Arakawa Chemical Industries, Ltd., Foral AX-E (trade name) and Staybelite Resin-E (trade name) manufactured by Eastman Chemical Company, Sylvaros PRR (trade name) manufactured by Arizona Chemical Ltd. and HARIMACK T-80 (trade name) manufactured by Harima Chemicals Group, Inc. These commercial tackifier resins may be used singly or in combination.

The hot melt pressure-sensitive adhesive of the present invention comprises (A) a polar functional group-modified conjugated diene-based polymer and (B) an aliphatic polyester-based resin, thereby an additive amount of (C) a tackifier resin can be reduced and it is to be environmentally superior.

<(D) Plasticizer>

In the present invention, the hot melt pressure-sensitive adhesive may further comprise the plasticizer (D) (D component). The plasticizer (D) is blended for the purposes of reducing the melt viscosity of the hot melt pressure-sensitive adhesive, providing flexibility to the hot melt pressure-sensitive adhesive, and improving the wetting property of the hot melt pressure-sensitive adhesive on an adherend. The plasticizer (D) is not particularly limited as long as it is compatible with other components, and the hot melt pressure-sensitive adhesive targeted by the present invention can be obtained.

Examples of the plasticizer include paraffin-based oils, naphthene-based oils and aromatic oils. Particularly, paraffin-based oils and/or naphthene-based oils are preferred, and colorless and odorless paraffin-based oils are most preferred.

Examples of commercial products of plasticizers include White Oil Broom 350 (trade name) manufactured by Kukdong Oil & Chem, Diana Fresia S-32 (trade name), Diana Process Oil PW-90 (trade name) and Daphne Oil KP-68 (trade name) manufactured by Idemitsu Kosan Co., Ltd., Enerper M1930 (trade name) manufactured by BP Chemicals, Kaydol (trade name) manufactured by Crompton, Primol 352 (trade name) manufactured by Exxon and Process Oil NS-100 (trade name) manufactured by Idemitsu Kosan Co., Ltd. These may be used alone or in combinations of two or more Blending the plasticizer (D) allows for improving compatibility with the components (A) to (C) comprised in the hot melt pressure-sensitive adhesive for labeling of the present invention, and further improving compatibility with other components, which results in improving pressure-sensitive adhesiveness, adhesion and coating performance of the hot melt pressure-sensitive adhesive.

<(E) Wax>

In the present invention, the hot melt pressure-sensitive adhesive may further comprise (E) Wax (E component). The "wax" is not particularly limited as long as it is a wax generally used in hot melt pressure-sensitive adhesives and provides the hot melt pressure-sensitive adhesive targeted by the present invention. Specific examples thereof include synthetic waxes, such as Fischer-Tropsch waxes and polyolefin waxes (polyethylene waxes and polypropylene waxes); petroleum waxes, such as paraffin waxes and microcrystalline waxes; and natural waxes, such as castor waxes.

If the hot melt pressure-sensitive adhesive for labeling of the present invention contains wax (E), the hot melt pressure-sensitive adhesive leaves little adhesive residue on a container when a label is removed from the container.

<(F) Thermoplastic Block Copolymer>

The hot melt pressure-sensitive adhesive of the present invention may comprise the thermoplastic block copolymer (F) (F component). The use of F component further improves the adhesion and pressure-sensitive adhesiveness. The thermoplastic block copolymer (F) may be non-hydrogenated or hydrogenated, and is preferably non-hydrogenated. A thermoplastic block copolymer having a polar functional group embraced by the above A component is excluded from the F component.

Examples of the "non-hydrogenated thermoplastic block copolymer" include a block copolymer obtained by block-copolymerizing a vinyl-based aromatic hydrocarbon and a conjugated diene compound without subsequently hydrogenating blocks based on the conjugated diene compound in the block copolymer. Examples of the "hydrogenated thermoplastic block copolymer" include a block copolymer obtained by block-copolymerizing a vinyl-based aromatic hydrocarbon and a conjugated diene compound, and then hydrogenating all or a part of blocks based on the conjugated diene compound.

The "conjugated diene compound" means a diolefin compound having at least a pair of conjugated double bonds.

Specific examples of the "conjugated diene compound" can include 1,3-butadiene, 2-methyl-1,3-butadiene (or isoprene), 2,3-dimethyl-1,3-butadiene, 1,3-pentadiene and 1,3-hexadiene. 1,3-Butadiene and 2-methyl-1,3-butadiene are particularly preferred. These conjugated diene compounds may be used alone or in combination.

The "vinyl-based aromatic hydrocarbon" means an aromatic hydrocarbon compound having a vinyl group. Specific examples thereof include styrene, o-methylstyrene, p-methylstyrene, p-tert-butylstyrene, 1,3-dimethylstyrene, α-methylstyrene, vinylnaphthalene and vinylanthracene. Particularly, styrene is preferred. These vinyl-based aromatic hydrocarbons may be used alone or in combination.

Specific examples of the "non-hydrogenated thermoplastic block copolymer" may include a styrene-isoprene-styrene block copolymer (also referred to as "SIS") and a styrene-butadiene-styrene block copolymer (also referred to as "SBS"). Specific examples of the "hydrogenated thermoplastic block copolymer" may include a hydrogenated styrene-isoprene-styrene block copolymer (that is, also referred to as the styrene-ethylene/propylene-styrene block copolymer "SEPS") and a hydrogenated styrene-butadiene-styrene block copolymer (that is, also referred to as the styrene-ethylene/butylene-styrene block copolymer "SEBS").

In the present invention, the thermoplastic block copolymer (F) preferably comprises both of SBS and SIS or either one of SBS and SIS.

In the present invention, the thermoplastic block copolymer (F) preferably comprises a triblock copolymer having a weight average molecular weight (Mw) of $7.5 \times 10^4$ to $1.0 \times 10^5$. The hot melt pressure-sensitive adhesive of the present invention with Mw in the above range has excellent coating properties and also excellent peel strength.

In the present invention, as the thermoplastic block copolymer (F), commercial products may be used. Examples thereof can include Tufprene T125 (trade name), Tuftec L518X (trade name) and Tuftec H1053 (trade name) manufactured by Asahi Chemical Industry Co., Ltd.; TR2000 (trade name) manufactured by JSR; TAIPOL 4202 (trade name) manufactured by TSRC; Kraton D1162PT (trade name) and G1650M (trade name) manufactured by Kraton Performance Polymers, Inc.; Asaprene T-438 (trade name) manufactured by Asahi Kasei Corporation; Quintac 3460 (trade name), Quintac 3433N (trade name), Quintac 3520 (trade name) and Quintac 3270 (trade name) manufactured by ZEON Corporation and D1160 (trade name) manufactured by Kraton. These commercial products may be used alone or in combination.

The hot melt pressure-sensitive adhesive according to the present invention may further comprise various additives as required. Examples of such various additives include a stabilizer and a fine particle filler.

The "stabilizer" is blended to prevent reduction of molecular weight by heating, gelation, coloration, generation of an odor and the like in the hot melt pressure-sensitive adhesive to improve the stability of the hot melt pressure-sensitive adhesive. The "stabilizer" is not particularly limited as long as the hot melt pressure-sensitive adhesive targeted by the present invention can be obtained. Examples of the "stabilizer" include an antioxidant and an ultraviolet absorbing agent.

Examples of the antioxidant include phenol-based antioxidants, sulfur-based antioxidants and phosphorus-based antioxidants. Examples of the ultraviolet absorbing agent include benzotriazole-based ultraviolet absorbing agents and benzophenone-based ultraviolet absorbing agents. Further, a lactone-based stabilizer may also be added. These may be used alone or in combination. As commercial products of antioxidants, the following products may be used.

Specific examples thereof include SUMILIZER GM (trade name), SUMILIZER TPD (trade name) and SUMILIZER TPS (trade name) manufactured by Sumitomo Chemical Co., Ltd., IRGANOX 1010 (trade name), IRGANOX HP2225FF (trade name), IRGAFOS 168 (trade name), IRGANOX 1520 (trade name) and TINUVIN P manufactured by Ciba Specialty Chemicals, JF77 (trade name) manufactured by Johoku Chemical Co., Ltd., TOMINOX TT (trade name) manufactured by API Corporation and AO-412S (trade name) manufactured by ADEKA CORPORATION. These stabilizers may be used alone or in combination.

The "ultraviolet absorbing agent" is used to improve the light resistance of the hot melt pressure-sensitive adhesive. The "antioxidant" is used to prevent the oxidative degradation of the hot melt pressure-sensitive adhesive.

The hot melt pressure-sensitive adhesive of the present invention may further comprise a fine particle filler. The fine particle filler may be a generally used one, and is not particularly limited as long as the hot melt pressure-sensitive adhesive targeted by the present invention can be obtained. Examples of the "fine particle filler" include mica, calcium carbonate, kaolin, talc, titanium oxide, diatomaceous earth, urea-based resins, styrene beads, fired clay and starch. The shape of these is preferably a spherical shape, and their sizes (diameter in the case of a spherical shape) are not particularly limited.

The hot melt pressure-sensitive adhesive according to the present invention may be produced by blending the A component, the B component and the C component and preferably the D component to F component, and further various additives as required, using a generally known method for producing a hot melt pressure-sensitive adhesive.

In the present invention, the blending ratio of the A component is preferably 5 to 20 parts by weight, more preferably 5 to 15 parts by weight, based on 100 parts by weight of the total weight of the A to F components.

The blending ratio of the B component is preferably 20 to 50 parts by weight, more preferably 20 to 40 parts by weight, based on 100 parts by weight of the total weight of the A to F components.

The blending ratio of the C component is preferably 20 to 40 parts by weight, more preferably 30 to 40 parts by weight, based on 100 parts by weight of the total weight of the A to F components.

The blending ratio of the D component is preferably 10 to 40 parts by weight, more preferably 10 to 35 parts by weight, based on 100 parts by weight of the total weight of the A to F components.

The blending ratio of the E component is preferably 0 to 10 parts by weight, more preferably 1 to 10 parts by weight, further preferably 1 to 5 parts by weight based on 100 parts by weight of the total weight of the A to F components.

The blending ratio of the F component is preferably 10 parts or less by weight, more preferably 3 to 6 parts by weight, based on 100 parts by weight of the total weight of the A to F components.

The hot melt pressure-sensitive adhesive according to the present invention may be produced by blending predetermined amounts of the above-described components, and heating and melting them. The order of adding the components, the heating method and the like are not particularly limited as long as the targeted hot melt pressure-sensitive adhesive is obtained.

As a further preferred embodiment of the present invention, the hot melt pressure-sensitive adhesive preferably has a viscosity (or melt viscosity) at 160° C. of 2000 mPa·s or less, particularly preferably 500 to 2000 mPa·s. With the viscosity at 160° C. in the above range, the hot melt pressure-sensitive adhesive is much more suitable for coating. The viscosity (or melt viscosity) at 160° C. herein means a value measured by a Brookfield viscometer using a No. 27 spindle.

The hot melt pressure-sensitive adhesive of the present invention comprises the above-described components (A) to (C) and in some cases comprises componehts (D) to (F) and other various additives. In a most preferred embodiment, the hot melt pressure-sensitive adhesive comprises an amino group-modified styrene-ethylene/butylene-styrene block copolymer (A), polylactic acid (B) and a rosin-based tackifier resin (C) having an acid value of 100 to 300 mg KOH/g.

The label according to the present invention comprises the above hot melt pressure-sensitive adhesive applied thereto. Specific examples of labels to which the hot melt pressure-sensitive adhesive is applied include labels made by using paper, treated paper (paper converted by aluminum vapor deposition, aluminum lamination, varnishing or resin finishing), paper such as synthesized paper, organic compound film, inorganic compound film, metal film or the like.

Preferred labels used in the present invention include film of an organic compound such as polypropylene, polyethylene terephthalate (PET) or polylactic acid (PLA) which is used particularly in alkaline washing. Preferred examples of polypropylene film include biaxially oriented polypropylene (OPP) film.

The hot melt pressure-sensitive adhesive of the present invention may be applied to the entire back side of a label, or some part of the back side of the label. Examples of methods of application include open wheel methods, closed gun methods and direct coating methods. Since no adhesive remains on a PET bottle when a label is removed, open wheel methods and direct coating methods are preferred.

The container according to the present invention comprises the above label adhered thereto. Specific examples thereof include glass containers such as glass bottles used for soft drinks, seasonings, detergents, shampoos, cooking oils, cosmetics and pharmaceutical products; plastic containers such as PET (polyethylene terephthalate) bottles; and metal cans such as aluminum cans. Among the above containers, PET bottles are particularly preferred in the present invention. Embodiments of labels of the present invention adhered to a PET bottle include labels adhered to part of the body of a PET bottle and "wrap around labels" rolled around the circumference of the body of a PET bottle.

The hot melt pressure-sensitive adhesive of the present invention is also preferably used for the adhesion of wrap around labels. Biaxially oriented polypropylene (OPP) film is often used as the wrap around label.

Prints may or may not be on a label to which the hot melt pressure-sensitive adhesive of the present invention is applied. When a printed label is used, the hot melt pressure-sensitive adhesive of the present invention may be applied to the printed side as well as the side without prints.

Examples of apparatuses for adhering a label to a PET bottle by using the hot melt pressure-sensitive adhesive for labeling of the present invention include an open wheel apparatus. In the open wheel apparatus, the hot melt pressure-sensitive adhesive for labeling is melted at 120 to 150° C. and applied to the back side of a label. The label is adhered to a PET bottle to prepare the container of the present invention.

The label adhered to a container by the hot melt pressure-sensitive adhesive for labeling of the present invention is easily removed from the container when the container is soaked in a hot alkaline solution. Therefore, the container is suitable for recycling. Methods for removing the label by using a hot alkaline solution are not particularly limited. Examples thereof include a method in which a container to which a label is adhered is cut into small pellets and the pellets are soaked in a hot alkaline aqueous solution (e.g., an aqueous sodium hydroxide solution at a temperature of 80° C. to 90° C. and a concentration of 0.5 to 5% by weight), and the solution is stirred for about 1 minute to 2 hours.

For the container to which a label is adhered by the hot melt pressure-sensitive adhesive for labeling of the present invention, the label will not be removed in a normal condition of use of the container due to sufficient adhesion of the adhesive. On the other hand, when the label is to be removed, for example after use of the container, the label can be removed by hand without adhesive residue.

EXAMPLES

For the purpose of describing the present invention in more details and more specifically, the present invention will be described below using Examples. These Examples are for illustrating the present invention, and are not intended to limit the present invention in any way.

Components blended in hot melt pressure-sensitive adhesives in examples and comparative example are shown below.

(A) polar functional group-modified conjugated diene-based copolymers (A-1) amino group-modified SEBS ("Tuftec MP10" manufactured by Asahi Kasei Chemicals Corporation)

(A-2) maleic acid group-modified SEBS ("Tuftec M1913" manufactured by Asahi Kasei Chemicals Corporation)

(A'-3) SEBS ("Kraton G-1650" manufactured by Shell Chemicals Co., Ltd.)

(B) aliphatic polyester-based resins (B-1) a poly LD-lactic acid resin ("4060D" (trade name) manufactured by NatureWorks LLC)

(B-2) a poly(butylene succinate) resin ("AD92W" (trade name) manufactured by Mitsubishi Chemical Corporation)

(C) tackifier resins (C-1) a rosin-based resin (KR-85 (trade name) manufactured by Arakawa Chemical Industries, Ltd., acid value 165 to 175 mg KOH/g)

(C-2) a rosin-based resin (ForalAX-E (trade name) manufactured by Eastman Chemical Company, acid value 166 mg KOH/g)

(C-3) a rosin-based resin (KE-604 (trade name) manufactured by Arakawa Chemical Industries, Ltd., acid value 230 to 245 mgKOH/g)

(C-4) terpene phenol resin (TAMANOL 803 (trade name) manufactured by Arakawa Chemical Industries, Ltd., acid value 45 to 60 mg KOH/g)

(C-5) a hydrogenated petroleum resin ("I-marv S110" (trade name) manufactured by Idemitsu Kosan Co., Ltd., acid value 0 mg KOH/g)

(C-6) a hydrogenated petroleum resin ("I-marv P125" (trade name) manufactured by Idemitsu Kosan Co., Ltd., acid value 0 mg KOH/g)

(C-7) a hydrogenated petroleum resin ("I-manv P90" (trade name) manufactured by Idemitsu Kosan Co., Ltd., acid value 0 mg KOH/g)

(C-8) a hydrogenated derivative of aromatic petroleum hydrocarbon resin ("ECR 179X" (trade name) manufactured by Exxon Mobil Corporation, acid value 0 mgKOH/g)

(C-9) a C9-based petroleum resin ("ARKON M100" (trade name) manufactured by Arakawa Chemical Industries, Ltd., acid value 0 mg KOH/g)

(D) plasticizers (D-1) a naphthene-based oil (NS-100 (trade name) manufactured by Idemitsu Kosan Co., Ltd.)

(D-2) a paraffin-based oil (Diana Fresia PW-90 (trade name) manufactured by Idemitsu Kosan Co., Ltd.)

(D-3) a paraffin-based oil (Diana Fresia S-32 (trade name) manufactured by Idemitsu Kosan Co., Ltd.)

(E) Wax (E-1) Maleic anhydride modified polypropylene wax (Licocene PPMA6202 (trade name) manufactured by Clariant)

(E-2) Fischer-Tropsch wax (Sasol C80 (trade name) manufactured by Sasol Limited)

(F) thermoplastic block copolymers (F-1) an SIS triblock copolymer (Quintac 3460 (trade name) manufactured by ZEON Corporation)

(F-2) an SBS triblock copolymer (TR2003 (trade name) manufactured by JSR)

(F-3) an SBS triblock copolymer (TR2250 (trade name) manufactured by JSR)

(G) antioxidants (G-1) a sulfur-based antioxidant (AO-412S (trade name) manufactured by ADEKA CORPORATION)

(G-2) a phenol-based antioxidant (SUMILIZER GM (trade name) manufactured by Sumitomo Chemical Co., Ltd.)

The (A) to (G) components were blended in blending proportions shown in Table 1 and Table 2, and melted and mixed at about 145° C. over about 3 hours using a universal stirrer to produce the hot melt pressure-sensitive adhesives of Examples 1 to 11 and Comparative Examples 1 to 5. The numerical values regarding the composition (blend) of the hot melt pressure-sensitive adhesives shown in Tables 1 and 2 are all parts by weight.

The alkali-peeling property, T-peel strength, thermal stability, hand-peeling property and coating performance of the respective hot melt pressure-sensitive adhesives of Examples and Comparative Examples were evaluated. In the following, the methods of measurement and methods of evaluation will be described.

<Alkali-Peeling Property>

An OPP film and a PET bottle were bonded by using the respective hot melt pressure-sensitive adhesives of Examples and Comparative Examples, and pellets (10 mm×50 mm) were prepared. The pellets were put in a 1.5% by weight sodium hydroxide solution at 85° C. and the solution was stirred for 15 minutes. After 15 minutes, the pellets were visually observed and the condition of the film was examined to evaluate the alkali-peeling property. The results are shown in Table 1 and Table 2. The criteria for the evaluation are as follows.

∘∘: Film was completely separated from PET bottle.
    ∘: Film was separated from PET bottle with 10 to 30% of adhesive residue.
    Δ: Film was separated from PET bottle with 30 to 50% of adhesive residue.
    x: Film was not separated from PET bottle.
    -- (Unable to measure): Phase separation of components occurred, or film could not be bonded to PET bottle due to the absence of adhesion.

<T-Peel Strength: OPP Film/OPP Film>

The hot melt pressure-sensitive adhesives of Examples and Comparative Examples were each applied to an OPP film having a thickness of 30 μm to form a pressure-sensitive adhesive layer having a thickness of 25 μm on the film. The resultant was then molded into a sample of 10 mm×50 mm.

The sample was bonded to another OPP film in an atmosphere at 20° C. For the condition of bonding, a 2 kg roller was used at a rate of 300 mm/minute. After bonding the two films, the resultant was aged for 2 hours at room temperature. Subsequently, the peel strength was measured in an atmosphere at 20° C. by using a universal tensile tester (RTM 250 made by ORIENTEC Co., LTD.) in a condition of a peel rate of 300 mm/minute. Three samples were measured for the respective hot melt pressure-sensitive adhesives and the peel strength was evaluated based on the average value. The results are shown in Table 1 and Table 2. The criteria for the evaluation are as follows.

○: a peel strength was 100 (g/10 mm) or more.
x: a peel strength was less than 100 (g/10 mm).
-- (Unable to measure): Phase separation of components occurred, or films could not be bonded due to the absence of adhesion.

<T-Peel Strength: OPP Film/PET Film>

One film of OPP film/OPP film was replaced with PET film, the peel strength for the OPP film/PET film was measured and evaluated in the same manner as in the measurement of the peel strength for OPP film/OPP film. The results are shown in Table 1 and Table 2. The criteria for the evaluation are as follows.

○: a peel strength was more than 100 (g/10 mm).
Δ: a peel strength was 50 to 100 (g/10 mm).
x: a peel strength was less than 50 (g/10 mm).
-- (Unable to measure): Phase separation of components occurred, or films could not be bonded due to the absence of adhesion.

<T-Peel Strength: OPP Film/PLA Film>

One film of OPP film/OPP film was replaced with PLA film, the peel strength for the OPP film/PLA film was measured and evaluated in the same manner as in the measurement of the peel strength for OPP film/OPP film. The results are shown in Table 1 and Table 2. The criteria for the evaluation are as follows.

○: a peel strength was more than 100 (g/10 mm).
Δ: a peel strength was 50 to 100 (g/10 mm).
x: a peel strength was less than 50 (g/10 mm).
-- (Unable to measure): Phase separation of components occurred, or films could not be bonded due to the absence of adhesion.

<Hand-Peeling Property>

The hot melt pressure-sensitive adhesives of Examples and Comparative Examples were each applied to an OPP film having a thickness of 30 μm to form a pressure-sensitive adhesive layer having a thickness of 25 μm on the film. The resultant was then molded into a sample of 10 mm×50 mm.

The sample was bonded to a PET bottle and aged at room temperature for 1 day. After that, the film was removed from the PET bottle by hand and whether or not the hot melt pressure-sensitive adhesive remained on the PET bottle was observed. The results are shown in Table 1 and Table 2. The criteria for the evaluation are as follows.

○○: No pressure-sensitive adhesive remained on PET bottle.
○: 10 to 30% of the hot melt pressure-sensitive adhesive remained on PET bottle.
x: Film could not be removed from PET bottle.
-- (Unable to measure): Phase separation of components occurred, or film could not be bonded to PET bottle due to the absence of adhesion.

<Coating Performance>

The hot melt pressure-sensitive adhesives of Examples and Comparative Examples were each melted at 160° C. After 30 minutes, the viscosity was measured by using a Brookfield viscometer. In the measurement, No. 27 spindle was used. The results are shown in Table 1 and Table 2. The criteria for the evaluation are as follows.

○: a viscosity was 500 mPa·s to 2000 mPa·s.
x: a viscosity was more than 2000 mPa·s.
-- (Unable to measure): Phase separation of components occurred and no pressure-sensitive adhesive could be prepared.

<Thermal Stability>

35 g of the respective hot melt pressure-sensitive adhesives of Examples and Comparative Examples was put in a 70 mL glass bottle and the bottle was allowed to stand in a dryer at 150° C. for 24 hours. Then the change in the appearance of the pressure-sensitive adhesives was visually observed. The results are shown in Table 1 and Table 2. The criteria for the evaluation are as follows.

β: Phase separation, carbonized product or ring (a degraded product of the hot melt pressure-sensitive adhesive deposited in a ring shape) was not observed.
Δ: No phase separation, but carbonized product and rings were observed.
x: Phase separation occurred and carbonized product and rings were observed.

TABLE 1

|       | Ex. 1 | Ex. 2 | Ex. 3 | Ex. 4 | Ex. 5 | Ex. 6 | Ex. 7 | Ex. 8 |
|-------|-------|-------|-------|-------|-------|-------|-------|-------|
| (A-1) | 10    | 6     | 7     | 7     | 12    | 12    | 12    | 12    |
| (A-2) |       |       |       |       |       |       |       |       |
| (A'-3)|       |       |       |       |       |       |       |       |
| (B-1) | 30    | 30    | 25    | 25    | 25    | 25    | 25    | 25    |
| (B-2) |       |       |       |       |       |       |       |       |
| (C-1) | 30    | 16    |       |       |       |       |       |       |
| (C-2) |       |       | 15    | 15    | 17    |       |       | 17    |
| (C-3) |       |       |       |       |       | 17    |       |       |
| (C-4) |       |       |       |       |       |       | 17    |       |
| (C-5) |       | 16    | 15    | 15    |       |       |       |       |
| (C-6) |       |       |       |       |       | 17    |       |       |
| (C-7) |       |       |       |       |       |       | 17    | 17    | 18 |
| (C-8) |       |       |       |       |       |       |       |       |
| (C-9) |       |       |       |       |       |       |       |       |
| (D-1) | 30    | 28    | 28    |       |       |       |       |       |
| (D-2) |       |       |       | 28    | 28    | 28    | 28    | 28    |
| (D-3) |       |       |       |       |       |       |       |       |

TABLE 1-continued

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| (E-1) |  |  | 5 |  |  |  |  |  |
| (E-2) |  |  |  | 5 | 1 | 1 | 1 |  |
| (F-1) |  | 4 |  |  |  |  |  |  |
| (F-2) |  |  |  | 5 |  |  |  |  |
| (F-3) |  |  | 5 |  |  |  |  |  |
| (G-1) | 0.2 | 0.2 | 0.2 | 0.2 | 0.2 | 0.2 | 0.2 | 0.2 |
| (G-2) | 0.3 | 0.3 | 0.3 | 0.3 | 0.3 | 0.3 | 0.3 | 0.3 |
| Total (parts by weight) | 100.5 | 100.5 | 100.5 | 100.5 | 100.5 | 100.5 | 100.5 | 100.5 |
| Alkali-peeling property | ○○ | ○○ | ○○ | ○○ | ○○ | ○○ | ○ | ○○ |
| Adhesion (T-peel adhesive strength) OPP film/OPP film (g/10 mm) | 120 | 120 | 130 | 160 | 100 | 130 | 110 | 100 |
| Evaluation | ○ | ○ | ○ | ○ | ○ | ○ | ○ | ○ |
| Adhesion (T-peel adhesive strength) OPP film/PET film (g/10 mm) | 300 | 350 | 260 | 180 | 130 | 150 | 140 | 160 |
| Evaluation | ○ | ○ | ○ | ○ | ○ | ○ | ○ | ○ |
| Adhesion (T-peel adhesive strength) OPP film/PLA film (g/10 mm) | 310 | 350 | 320 | 180 | 140 | 150 | 130 | 200 |
| Evaluation | ○ | ○ | ○ | ○ | ○ | ○ | ○ | ○ |
| Hand-peeling property OPP film/PET bottle | ○ | ○ | ○○ | ○○ | ○○ | ○○ | ○○ | ○○ |
| Coating performance (mPa · s) | 700 | 800 | 900 | 900 | 700 | 900 | 700 | 800 |
| Evaluation | ○ | ○ | ○ | ○ | ○ | ○ | ○ | ○ |
| Thermal stability | ○ | ○ | ○ | ○ | ○ | ○ | ○ | ○ |

Ex. = Example

TABLE 2

|  | Ex. 9 | Ex. 10 | Ex. 11 | Com-Ex. 1 | Com-Ex. 2 | Com-Ex. 3 | Com-Ex. 4 | Com-Ex. 5 |
|---|---|---|---|---|---|---|---|---|
| (A-1) |  |  | 12 | 5 |  | 40 | 10 |  |
| (A-2) |  | 15 |  |  |  |  |  |  |
| (A'-3) |  |  |  |  |  |  |  | 15 |
| (B-1) | 25 |  | 40 | 40 |  | 30 | 30 | 30 |
| (B-2) |  | 25 |  |  |  |  |  |  |
| (C-1) |  |  |  |  |  |  |  |  |
| (C-2) | 17 | 17 |  | 15 | 15 |  | 10 | 10 |
| (C-3) |  |  |  |  |  |  |  |  |
| (C-4) |  |  |  |  |  |  |  |  |
| (C-5) |  |  |  | 15 | 15 |  | 15 | 15 |
| (C-6) |  |  |  |  |  |  |  |  |
| (C-7) | 18 | 18 |  |  |  |  |  |  |
| (C-8) |  |  | 18 |  |  |  |  |  |
| (C-9) |  |  | 18 |  |  |  |  |  |
| (D-1) |  |  |  |  |  |  |  |  |
| (D-2) | 25 | 28 |  | 30 | 30 | 60 | 30 | 30 |
| (D-3) |  |  | 14 |  |  |  |  |  |
| (E-1) |  |  |  |  |  |  |  |  |
| (E-2) |  |  |  |  |  |  |  |  |
| (F-1) |  |  | 5 |  |  |  | 15 |  |
| (F-2) |  |  |  |  |  |  |  |  |
| (F-3) |  |  |  |  |  |  |  |  |
| (G-1) | 0.2 | 0.2 | 0.2 | 0.2 | 0.2 | 0.2 | 0.2 | 0.2 |
| (G-2) | 0.3 | 0.3 | 0.3 | 0.3 | 0.3 | 0.3 | 0.3 | 0.3 |
| Total (parts by weight) | 100.5 | 100.5 | 100.5 | 100.5 | 100.5 | 100.5 | 100.5 | 100.5 |
| alkali-peeling property | ○○ | ○○ | Δ | — | ○○ | — | — | — |
| adhesion (T-peel adhesive strength) OPP film/OPP film (g/10 mm) | 120 | 100 | 300 | — | 30 | — | — | — |
| Evaluation | ○ | ○ | ○ | — | x | — | — | — |
| adhesion (T-peel adhesive strength) OPP film/PET film (g/10 mm) | 150 | 160 | 380 | — | 70 | — | — | — |
| Evaluation | ○ | ○ | ○ | — | Δ | — | — | — |
| Adhesion (T-peel adhesive strength) OPP film/PLA film (g/10 mm) | 160 | 180 | 410 | — | 70 | — | — | — |
| Evaluation | ○ | ○ | ○ | — | Δ | — | — | — |
| Hand-peeling property OPP film/PET bottle | ○○ | ○○ | ○ | — | ○○ | — | — | — |
| Coating performance (mPa · s) | 1,200 | 1,000 | 1,300 | — | 20,000 | 500 | — | — |
| Evaluation | ○ | ○ | ○ | — | x | ○ | — | — |
| Thermal stability | ○ | ○ | ○ | x | Δ | ○ | x | x |

Ex. = Example,
Com-Ex. = Comparative Example

As shown in Table 1 and Table 2, the hot melt pressure-sensitive adhesives of Examples which contain all of the three components (A) to (C) are excellent in all of alkali-peeling property, adhesion, hand-peeling property, coating performance and thermal stability.

On the other hand, as shown in Table 2, the hot melt pressure-sensitive adhesives of Comparative Examples which do not contain one of the components (A) to (C) have much poorer properties than those of the hot melt pressure-sensitive adhesives of Examples. Thus, it is demonstrated that the advantageous effects of the present invention are obtained when the hot melt pressure-sensitive adhesive contains all of the three components (A) to (C).

INDUSTRIAL APPLICABILITY

The present invention can provide a hot melt pressure-sensitive adhesive for labeling, a label to which the hot melt pressure-sensitive adhesive is applied and a container to which the label is adhered. The container according to the present invention is particularly useful as a PET bottle for drinks to which an organic film is adhered.

The invention claimed is:

1. A hot melt pressure-sensitive adhesive for labeling comprising:
   (A) a polar functional group-modified conjugated diene-based polymer having a weight average molecular weight range of $7.5 \times 10^4$ to $1.0 \times 10^5$,
   (B) an aliphatic polyester-based resin, and
   (C) a tackifier resin.

2. The hot melt pressure-sensitive adhesive for labeling according to claim 1, wherein the polar functional group-modified conjugated diene-based polymer (A) is a hydrogenated conjugated diene-based polymer having at least one functional group selected from an acid anhydride group, a maleic acid group, a carboxyl group, an amino group, an imino group, an alkoxysilyl group, a silanol group, a silyl ether group, a hydroxyl group and an epoxy group.

3. The hot melt pressure-sensitive adhesive for labeling according to claim 1, wherein the polar functional group-modified conjugated diene-based polymer (A) comprises at least one selected from an amino group-modified styrene-ethylene/butylene-styrene block copolymer and a maleic acid group-modified styrene-ethylene/butylene-styrene block copolymer.

4. The hot melt pressure-sensitive adhesive for labeling according to claim 1, wherein the aliphatic polyester-based resin (B) is at least one selected from a polylactic acid and a poly(butylene succinate).

5. A label on which the hot melt pressure-sensitive adhesive for labeling according to claim 1 is applied.

6. A container to which the label according to claim 5 is adhered.

7. A hot melt pressure-sensitive adhesive for labeling comprising:
   (A) a polar functional group-modified styrene-ethylene/butylene-styrene block copolymer,
   (B) an aliphatic polyester-based resin, and
   (C) 20 to 40 parts, based on the total weight of the adhesive, of a tackifier resin.

8. The hot melt pressure-sensitive adhesive of claim 7, wherein the polar functional group-modified styrene-ethylene/butylene-styrene block copolymer is an amino group-modified styrene-ethylene/butylene-styrene block copolymer and/or maleic acid group-modified styrene-ethylene/butylene-styrene block copolymer.

* * * * *

UNITED STATES PATENT AND TRADEMARK OFFICE
CERTIFICATE OF CORRECTION

PATENT NO. : 9,828,535 B2
APPLICATION NO. : 14/669630
DATED : November 28, 2017
INVENTOR(S) : Makoto Takenaka and Tadashi Hayakawa It is certified that error appears in the above-identified patent and that said Letters Patent is hereby corrected as shown below:

In the Specification

Column 10, Line 12: Change "componehts" to -- components --.

Column 11, Line 65: Change "I-manv" to -- I-marv --.

Column 14, Line 42: Change "β" to -- o --.

Signed and Sealed this
Twenty-eighth Day of May, 2019

Andrei Iancu
*Director of the United States Patent and Trademark Office*